United States Patent
Kim (10) Patent No.: US 9,953,380 B2
(45) Date of Patent: Apr. 24, 2018

(54) METHOD AND SYSTEM FOR SETTING RELATIONSHIP BETWEEN USERS OF SERVICE USING GESTURES INFORMATION

(71) Applicant: NAVER Business Platform Corporation, Seongnam-si (KR)

(72) Inventor: DongWook Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 536 days.

(21) Appl. No.: 14/243,389

(22) Filed: Apr. 2, 2014

(65) Prior Publication Data
US 2014/0365485 A1 Dec. 11, 2014

(30) Foreign Application Priority Data
Jun. 10, 2013 (KR) .......................... 10-2013-066163

(51) Int. Cl.
*G06F 3/0488* (2013.01)
*H04W 8/14* (2009.01)
(Continued)

(52) U.S. Cl.
CPC ......... *G06Q 50/01* (2013.01); *G06F 3/04883* (2013.01); *G06F 3/04886* (2013.01);
(Continued)

(58) Field of Classification Search
CPC .. G06F 3/04883; G06F 3/017; G06F 3/04842; G06F 3/0488; G06F 3/0482;
(Continued)

(56) References Cited

U.S. PATENT DOCUMENTS 7,532,196 B2 * 5/2009 Hinckley ................ G06F 3/011
345/156
8,913,955 B1 * 12/2014 Mincher .............. H04B 5/0075
455/41.1
(Continued)

FOREIGN PATENT DOCUMENTS

JP 2011-048610 3/2011
JP 2011-096102 5/2011
(Continued)

OTHER PUBLICATIONS

Japanese Office Action dated Apr. 21, 2015 by the Japanese Patent Office corresponding to Japanese patent application No. 2014-061373.
(Continued)

*Primary Examiner* — Tadesse Hailu
(74) *Attorney, Agent, or Firm* — Greer Burns & Crain, Ltd.

(57) ABSTRACT

A method for setting a relationship between users of a plurality of mobile terminals includes receiving, from a plurality of mobile terminals, information on gestures made on, and recognized at, the plurality of mobile terminals, respectively, with respect to a single user gesture; determining a gesture correlation between the recognized gestures and the single user gesture based on information on the recognized gestures; and determining whether to set a relationship between users of the plurality of mobile terminals based on the gesture correlation.

24 Claims, 8 Drawing Sheets

(51) Int. Cl.
*G06Q 50/00* (2012.01)
*G06F 3/14* (2006.01)

(52) U.S. Cl.
CPC ....... *G06F 3/1423* (2013.01); *G09G 2354/00* (2013.01); *G09G 2370/022* (2013.01); *G09G 2370/042* (2013.01)

(58) Field of Classification Search
CPC ......... G06F 3/04847; G06F 2221/2111; G06F 21/35; G06F 17/30241; H04W 4/008; H04W 4/023; H04W 56/0015; H04W 76/025; H04W 8/24; H04W 8/245; H04W 4/026; H04W 64/00; G06Q 50/01
USPC .................................................. 715/863–866
See application file for complete search history.

(56) References Cited

U.S. PATENT DOCUMENTS

| | | | |
|---|---|---|---|
| 8,970,525 B1* | 3/2015 | de los Reyes | G06F 3/016 345/173 |
| 9,131,333 B2* | 9/2015 | Gai | G06F 3/041 |
| 2005/0030255 A1* | 2/2005 | Chiu | G06F 3/04883 345/1.3 |
| 2010/0167715 A1 | 7/2010 | Domene et al. | |
| 2011/0065459 A1* | 3/2011 | Cheng | H04W 4/023 455/457 |
| 2011/0142016 A1 | 6/2011 | Chatterjee | |
| 2012/0113011 A1* | 5/2012 | Wu | G06F 3/018 345/169 |
| 2012/0131519 A1* | 5/2012 | Jitkoff | G06F 3/0481 715/863 |
| 2012/0184335 A1* | 7/2012 | Kim | G06F 3/04883 455/566 |
| 2012/0242581 A1* | 9/2012 | Laubach | G06F 3/04812 345/168 |
| 2012/0271882 A1* | 10/2012 | Sachdeva | H04N 21/26258 709/204 |
| 2013/0125016 A1* | 5/2013 | Pallakoff | G06F 3/04817 715/748 |
| 2013/0157562 A1* | 6/2013 | Urard | G06F 21/35 455/39 |
| 2013/0169550 A1* | 7/2013 | Gai | G06F 3/041 345/173 |
| 2014/0206288 A1* | 7/2014 | Liu | H04W 12/04 455/41.2 |
| 2015/0126118 A1* | 5/2015 | Lin | H04W 76/023 455/41.2 |

FOREIGN PATENT DOCUMENTS

| | | |
|---|---|---|
| JP | 2011-103111 | 5/2011 |
| JP | 2012-003635 | 1/2012 |
| JP | 2012-142794 | 7/2012 |
| JP | 2012-212402 | 11/2012 |
| JP | 2013-027029 | 2/2013 |
| KR | 10-1107027 | 1/2012 |
| WO | WO/2011/105322 | 9/2011 |

OTHER PUBLICATIONS

Korean Office Action dated Sep. 30, 2014 by the Korean Patent Office corresponding to Korean patent application No. 10-2013-0066163.

* cited by examiner

METHOD AND SYSTEM FOR SETTING RELATIONSHIP BETWEEN USERS OF SERVICE USING GESTURES INFORMATION

CROSS-REFERENCE TO RELATED APPLICATION

This application claims priority from and the benefit of Korean Patent Application No. 10-2013-0066163, filed on Jun. 10, 2013, which is hereby incorporated by reference for all purposes as if fully set forth herein.

BACKGROUND OF THE INVENTION

Example embodiments relate to a method and system for setting a relationship between users of a service based on gesture information.

A social network service (SNS) refers to a service that enables users to form a human network on a web. A variety of technologies may be used to set a relationship between users for a connection to a human network.

In a related art, a list of users having joined a service and a function of searching for another user from the list may be provided to users. A user may find another user that the user is to find and may set a relationship with the found user using the list and the function. In a related art, once a user initially provides, to a service, an identifier, for example, an ID or a telephone number of another user with whom the user is to set a relationship, the service may find a user corresponding to the identifier and start to set the relationship with the found user.

However, the above-noted relationship setting methods require a complex procedure, such as input of an ID and search of a target user from a list, for example. In particular, in a mobile environment, a limitation of an input/output (I/O) interface may act as an interrupting element in setting a relationship between users and diffusing a service.

Accordingly, there is a need for a more intuitive interface for setting a relationship between users in a mobile environment.

SUMMARY OF THE INVENTION

Example embodiments provide a relationship setting method and system for setting a relationship between users based on information on a plurality of gestures, for example, touch-and-drag gestures, respectively recognized at a plurality of terminals having a correlation in terms of at least a geographical location.

Example embodiments also provide a relationship setting method and system for setting a relationship between users based on information on times at which gestures are recognized at a plurality of terminals and information on directions of touch-and-drag gestures.

Example embodiments also provide a relationship setting method and system for setting a relationship between users based on a plurality of gestures recognized at a plurality of terminals, instead of using a motion of terminals via an acceleration sensor and thus, obtaining more accurate information used to set a relationship between users even in a circumstance in which a motion of terminals cannot be accurately determined, such as in a driving vehicle.

Additional features of the example embodiments will be set forth in the description which follows, and in part will be apparent from the description, or may be learned by practice of the example embodiments.

Example embodiments disclose a relationship setting method, including: receiving, from a plurality of mobile terminals, information on gestures recognized at the plurality of mobile terminals, respectively, with respect to a single user gesture; determining a gesture correlation between the recognized gestures and the single user gesture based on information on the recognized gestures; and determining whether to set a relationship between users of the plurality of mobile terminals based on the gesture correlation.

Example embodiments also disclose a relationship setting system, including: an information receiver configured to receive, from a plurality of mobile terminals, information on gestures recognized at the plurality of mobile terminals, respectively, with respect to a single user gesture; a correlation determiner configured to determine a gesture correlation between the recognized gestures and the single user gesture based on information on the recognized gestures; and a relationship setter configured to determine whether to set a relationship between users of the plurality of mobile terminals based on the gesture correlation.

Example embodiments also disclose a method of setting a relationship between a user of a mobile terminal and a user of at least one another mobile terminal, the method including: recognizing at least a portion of a user gesture occurring over the mobile terminal and the at least one other mobile terminal, using a touch display or a motion sensor of the mobile terminal; and transmitting information on the recognized at least a portion of the user gesture to a relationship setting server. Information on at least a portion of the user gesture recognized at the at least one other mobile terminal may be transmitted to the relationship setting server, and whether to set a relationship between users of the mobile terminal and the at least one other mobile terminal may be determined at the relationship setting server based on information on gestures transmitted from the mobile terminal and the at least one other mobile terminal.

Example embodiments also disclose a file distribution system configured to distribute a file for an installation of an application for controlling a mobile terminal to set a relationship between a user of the mobile terminal and a user of at least one another mobile terminal, the file distribution system including a file manager configured to manage the file and to provide the file to the mobile terminal in response to a request of the mobile terminal. The application may include: a module configured to control the mobile terminal to recognize at least a portion of a user gesture occurring over the mobile terminal and the at least one other mobile terminal, using a touch display or a motion sensor of the mobile terminal; and a module configured to control the mobile terminal to transmit information on the recognized at least a portion of the user gesture to a relationship setting server. Information on at least a portion of the user gesture recognized at the at least one other mobile terminal may be transmitted to the relationship setting server, and whether to set a relationship between users of the mobile terminal and the at least one other mobile terminal may be determined at the relationship setting server based on information on gestures transmitted from the mobile terminal and the at least one other mobile terminal.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

DETAILED DESCRIPTION OF EXAMPLE EMBODIMENTS

The invention is described more fully hereinafter with reference to the accompanying drawings, in which example embodiments are shown. This invention may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and areas may be exaggerated for clarity. Like reference numerals in the drawings denote like elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different directions of the device in use or operation in addition to the direction depicted in the figures. For example, if the device in the figures is turned over, elements described as "below" or "beneath" other elements or features would then be oriented "above" the other elements or features. Thus, the example term "below" can encompass both a direction of above and below. The device may be otherwise oriented (rotated 90 degrees or at other directions) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
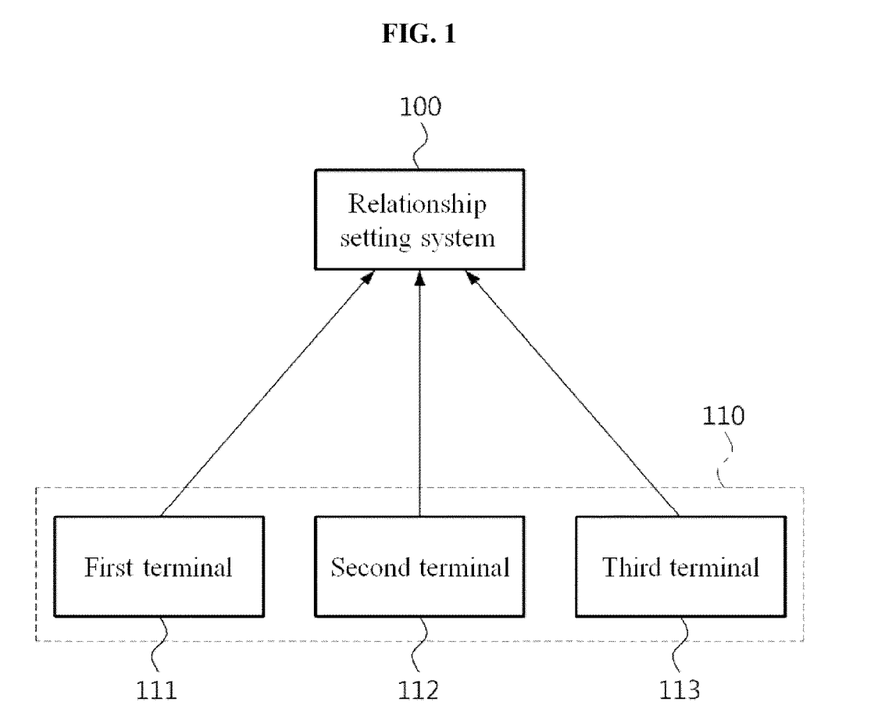
FIG. 1 illustrates an example of a relationship between a relationship setting system and a plurality of terminals according to an example embodiment.

Hereinafter, example embodiments will be described with reference to the accompanying drawings. FIG. 1 illustrates an example of a relationship between a relationship setting system 100 and a plurality of terminals 110 according to an example embodiment. The relationship setting system 100 according to an example embodiment refers to a system included in or associated with a service system, for example, a social network system (not shown), configured to provide a service based on a relationship between users. For example, when a relationship is set between users through the relationship setting system 100, the service system may provide a service based on information on the set relationship between the users. Here, the service system may further use information on the set relationship for other purposes.

The relationship setting system 100 may receive, from each of a plurality of terminals 110, information used to set the relationship through communication therewith over a network, and may set the relationship between users of terminals satisfying a condition among the plurality of terminals 110, based on the received information.

The plurality of terminals 110 may refer to mobile terminals in which an application associated with the relationship setting system 100 or the service system is installed. Each of the plurality of terminals 110 may generate information used to set the relationship through an interface provided from the application, and may transmit the generated information to the relationship setting system 100. For example, information used to set the relationship, which is transmitted from each of the plurality of terminals 110 to the relationship setting system 100, may include information on a gesture recognized at each terminal or information generated at each terminal based on information on the recognized gesture.

The term "gesture" used throughout may refer to a predetermined action of a user (hereinafter, a "user gesture") recognizable by mobile terminals. In response to an occurrence of a user gesture over a plurality of mobile terminals, each of the plurality of mobile terminals may recognize at least a portion of the user gesture (hereinafter, a "recognized gesture), and may obtain information on the recognized gesture.

For example, in a state in which the above-noted application is installed and executed in each of the terminals 110 including a first terminal 111, a second terminal 112, and a third terminal 113, the installed application may provide an interface for setting a relationship between users of the terminals 110. In response to a recognition of at least a portion of a user gesture through the interface, each of the terminals 110 may generate information used to set the relationship and may transmit the generated information to the relationship setting system 100. In this case, the relationship setting system 100 may set the relationship between users of the terminals 110 based on the received information and a predetermined condition. Here, satisfying the predetermined condition may indicate that a plurality of sets of information on gestures recognized at and transmitted from the respective terminals 110 are generated with respect to a single user gesture.

To this end, each of the terminals 110 may transmit the following information (1) to the relationship setting system 100.

(1) Information on a recognized gesture:

Here, information on a recognized gesture may at least include the following (1-1) and then may selectively further include (1-2).

(1-1) Information on gesture recognition coordinates at least including information on a location at which a recognition of a gesture starts in a terminal and information on a location at which the recognition of the gesture ends in the terminal:

For example, information on a recognized gesture may include information on coordinates, such as ((x1, x2), (y1, y2)). In this case, information on a direction of the gesture may be extracted based on start coordinates (x1, x2) and end coordinates (y1, y2).

(1-2) Information on a time at which a gesture is recognized:

Also, each of the terminals 110 may further transmit the following information (2) or (3) to the relationship setting system 100, depending on necessity.

(2) Information on a geographical location of a terminal:

For example, information on gestures recognized at and transmitted from the respective terminals 110 may use a location correlation between geographical locations of the terminals 110 to further clearly determine that the transmitted information is generated with respect to a single user gesture. Here, information on a geographical location of a terminal may refer to global positioning system (GPS) information of the terminal or location information determined through an access point (AP).

(3) Information on a direction of a terminal:

For example, information on a direction of a terminal may be obtained by combining a gyro sensor and a geomagnetic sensor or an acceleration sensor included in the terminal.

The relationship setting system 100 may determine whether to set a relationship between users based on information received from each of the terminals 110, and may set the relationship between users satisfying a predetermined condition.

Hereinafter, examples of using a touch-and-drag gesture will be described as an example of a user gesture for ease of description and understanding. However, to verify whether a plurality of sets of information transmitted from the respective terminals 110 is generated with respect to a single user gesture, a variety of methods, such as a recognition of a motion gesture and a recognition of a multi-touch and drag gesture, for example, may be used. For example, the plurality of terminals 110 may recognize various touch gestures such as a touch-and-drag gesture and a multi-touch-and-drag gesture of a user using a touch display. As another example, the plurality of terminals 110 may also recognize a motion gesture of a user using a motion sensor.

Figure 2:
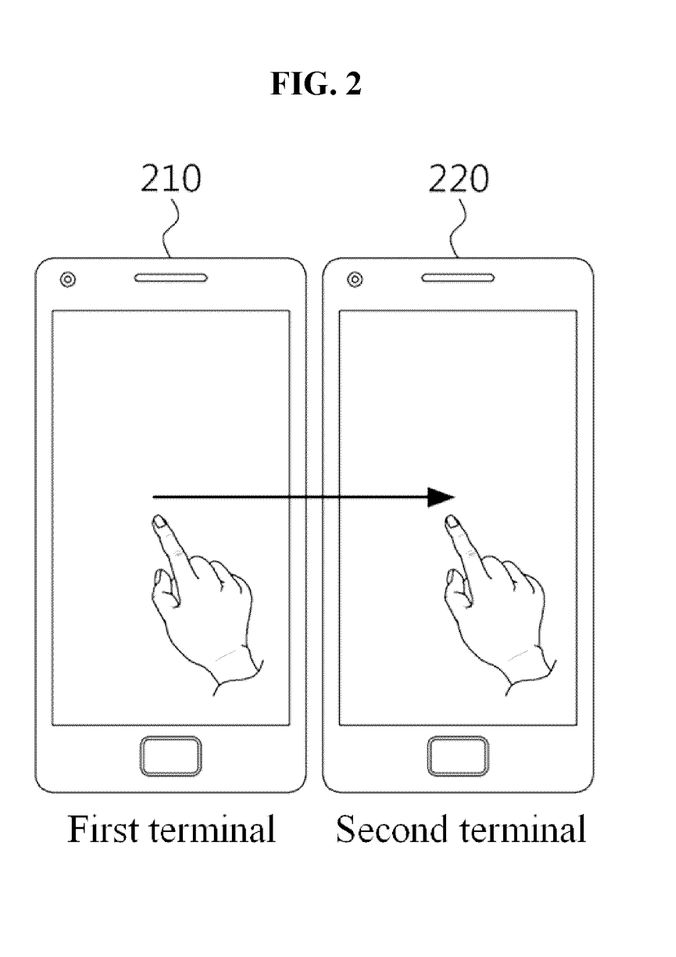
FIG. 2 illustrates an example of a process of generating information used to set a relationship between users of two mobile terminals according to an example embodiment.

FIG. 2 illustrates an example of a process of generating information used to set a relationship between users of two mobile terminals according to an example embodiment. Referring to FIG. 2 a first terminal 210 and a second terminal 220 are disposed to be adjacent to each other in a horizontal direction. When a first user of the first terminal 210 and a second user of the second terminal 220 are assumed to be present, the first user or the second user performs a touch-and-drag gesture consecutively from the left to the right on touch displays of the first terminal 210 and the second terminal 220 that are disposed to be adjacent to each other. Although the user gesture is described to be in a linear shape from the left to the right, a shape or a direction of the user gesture required for a relationship setting may be preset and be guided for users depending on necessity.

In this example, the first terminal 210 may initially recognize the user gesture before the second terminal 220. Once the first terminal 210 completes the recognition of the user gesture, the second terminal 220 may start to recognize the user gesture. Information on the user gesture recognized at each of the first terminal 210 and the second terminal 220 may be transmitted to the relationship setting system 100 of FIG. 1. Here, an application may be installed and executed in each of the first terminal 210 and the second terminal 220, and each of the first terminal 210 and the second terminal 220 may transmit a portion recognized from the user gesture (hereinafter, a "recognized gesture) to the relationship setting system 100 according to the control of the application.

An example embodiment of setting a relationship between the first user and the second user based on (2) information on a geographical location of a terminal and (1) information on a recognized gesture will be described. Here, (1) information on a recognized gesture is assumed to include (1-1) information on gesture recognition coordinates at least including information on a location at which a recognition of a gesture starts in a terminal and information on a location at which the recognition of the gesture ends in the terminal.

The first terminal 210 may transmit information on a location of the first terminal 210 and information on first gesture recognition coordinates to the relationship setting system 100. Here, information on the first gesture recognition coordinates may at least include information on a location at which a first recognized gesture starts in the first terminal 210 and information on a location at which the first recognized gesture ends in the first terminal 210.

The second terminal 220 may transmit information on a location of the second terminal 220 and information on second gesture recognition coordinates. Here, information on the second gesture recognition coordinates may at least include information on a location at which a second recognized gesture starts in the second terminal 220 and information on a location at which the second recognized gesture ends in the second terminal 220.

The relationship setting system 100 may determine whether the first terminal 210 and the second terminal 220 are present at a correlated location by comparing information on the location of the first terminal 210 to information on the location of the second terminal 220. For example, the relationship setting system 100 may verify whether the first terminal 210 and the second terminal 220 are present within a predetermined distance.

The relationship setting system 100 may determine whether the first recognized gesture and the second recognized gesture are portions of a single user gesture, based on information on the first recognized gesture and information on the second recognized gesture. For example, when a user gesture preset to set a relationship between users is a touch-and-drag gesture crossing the first terminal 210 and the second terminal 220, the relationship setting system 100 may determine a location correlation between a location at which a single gesture ends and a location at which another gesture starts and thereby determine whether the first recognized gesture and the second recognized gesture are portions of a single user gesture.

More specifically, referring again to FIG. 2, when the first recognized gesture ends at the right end of a screen of the first terminal 210 and the second recognized gesture starts from the left end of a screen of the second terminal 220, and a vertical coordinate at the location at which the first recognized gesture ends and a vertical coordinate at the location at which the second recognized gesture ends are present within a predetermined range difference, the relationship setting system 100 may determine that the two recognized gestures, that is, the first recognized gesture and the second recognized gesture, are portions of a single user gesture.

According to other example embodiments, to increase the accuracy of determination, (1) information on a recognized gesture may further include (1-2) information on a time at which a gesture is recognized. For example, although the relationship setting system 100 receives, from a plurality of terminals, information on allowable locations and information on gestures having a location correlation therebetween, the gestures may be gestures that have been recognized at different times. Accordingly, to further increase the accuracy in determining that gestures recognized at different times are portions of a single user gesture, information on times at which the gestures are recognized may be further used.

According to still other example embodiments, to further increase the accuracy of determination, (3) information on a direction of a terminal may be further transmitted to the relationship setting system 100. For example, referring to FIG. 2, the first terminal 210 and the second terminal 220 are disposed in the same direction. However, when a terminal direction is changed, a determination about a required condition may be inaccurate. Accordingly, each of the first terminal 210 and the second terminal 220 may transmit its direction information to the relationship setting system 100. The relationship setting system 100 may determine the required condition by further referring to the received direction information.

Figure 3:
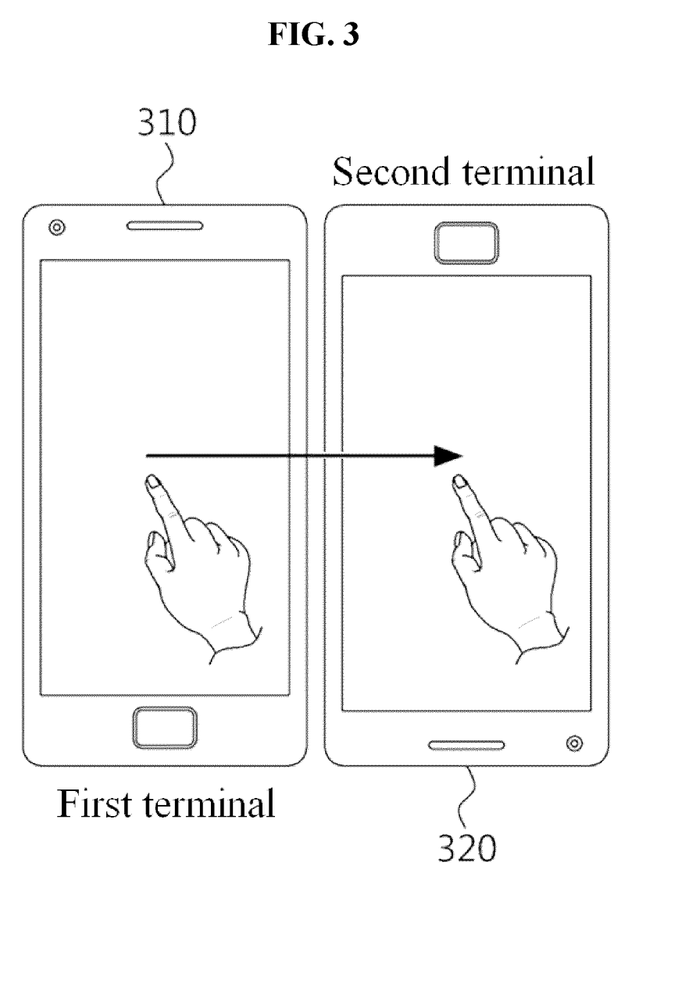
FIG. 3 illustrates an example of a process of generating information used to set a relationship between users of terminals disposed in different directions according to an example embodiment.

FIG. 3 illustrates an example of a process of generating information used to set a relationship between users of terminals disposed in different directions according to example embodiments. Referring to FIG. 3, a first terminal 310 and a second terminal 320 are disposed to face opposite directions. Here, a recognition of a user gesture ends at the right end (a right side on the drawing) of the first terminal 310 and starts from the right end (a left side on the drawing) of the second terminal 320. Accordingly, in this case, the relationship setting system 100 may determine whether a gesture recognized at the first terminal 310 and a gesture recognized at the second terminal 320 are portions of a single user gesture by further receiving direction information from each of the first terminal 310 and the second terminal 320 and by referring to the received direction information.

For example, as described above, the relationship setting system 100 may determine whether to set a relationship by determining that gestures recognized based on directions of terminals are portions of a single user gesture. Although FIG. 3 illustrates two terminals, for example, the first terminal 310 and the second terminal 320, disposed in different directions by 180 degrees, example embodiments may be applied alike to a plurality of terminals disposed in various directions, such as 90 degrees and 270 degrees.

As another example, the relationship setting system 100 may also operate to be capable of setting a relationship between users of terminals only in a case in which the terminals are disposed in the same direction.

A process of generating information used to set a relationship between users of two mobile terminals is described with reference to FIGS. 2 and 3. A relationship setting method according to the example embodiments may be applied regardless of the number of terminals and thus, may be used to set a relationship between users of terminals in the aforementioned manner.

Figure 4:
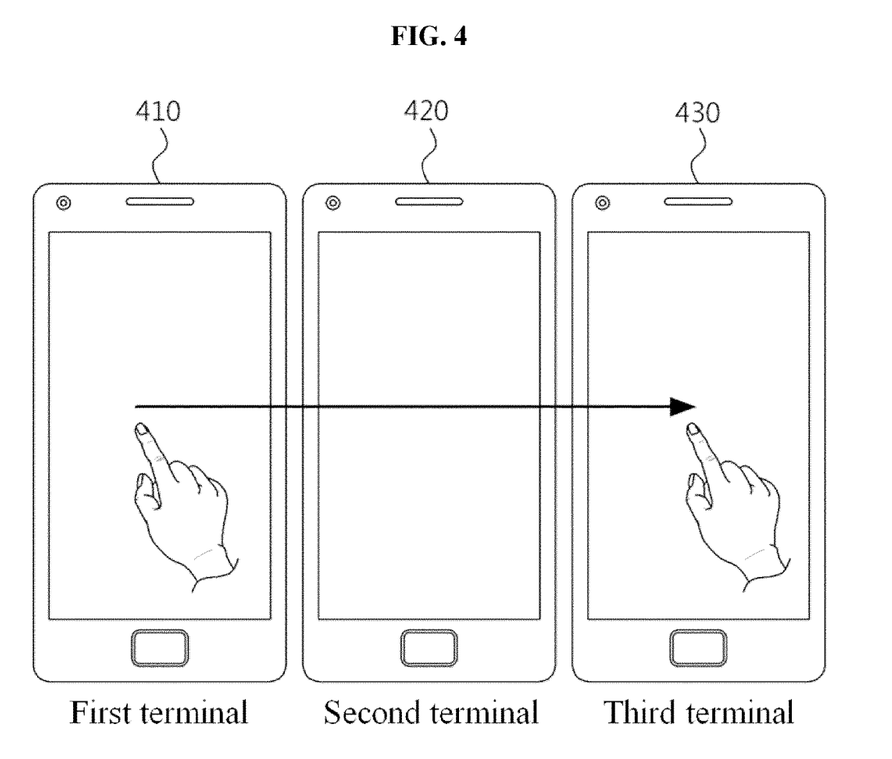
FIG. 4 illustrates an example of a process of generating information used to set a relationship among users of three mobile terminals according to an example embodiment.

FIG. 4 illustrates an example of a process of generating information used to set a relationship among users of three mobile terminals according to example embodiments. For example, FIG. 4 illustrates a process in which a single user gesture is being partially recognized by each of three terminals, for example, a first terminal 410, a second terminal 420, and a third terminal 430.

In this case, different portions of the user gesture may be recognized in order of the first terminal 410, the second terminal 420, and the third terminal 430. Whether recognized gestures are portions of the single user gesture may be determined based on a location at which a recognized gesture of the first terminal 410 ends and a location at which a recognized gesture of the second terminal 420 starts, and a location at which the recognized gesture of the second terminal 420 ends and a location at which a recognized gesture of the third terminal 430 starts.

Also, to further increase accuracy of a determination as to whether to set a relationship, at least one of information on geographical locations of terminals, information on directions of the terminals, and information on times at which gestures are recognized may be selectively further used.

For example, terminals to be compared may be selected based on order in which gestures are recognized at the first terminal 410, the second terminal 420, and the third terminal 430, respectively. Referring to FIG. 4, a gesture is initially recognized at the first terminal 410 and then recognized at the second terminal 420 and thus, the relationship setting system 100 may initially compare information on the gesture recognized at the first terminal 410 to information on the gesture recognized at the second terminal 420, and subsequently compare information on the gesture recognized at the second terminal 420 to information on the gesture recognized at the third terminal 430. That is, information on a time at which each gesture is recognized may also be used as direct information to determine whether the recognized gestures are portions of a single user gesture and may also be used to decrease an amount of calculation of the relationship setting system 100.

Similarly, information on geographical locations of terminals may also be used as direct information to determine whether the recognized gestures are portions of a single user gesture and may also be used to decrease an amount of calculation of the relationship setting system 100. In this instance, a relationship may be set among users of three terminals and may be set as a single group based on user settings. The example embodiments may also be applied alike to four or more terminals.

Although only a touch-and-drag gesture of a straight direction is described with reference to FIGS. 2 through 4, a touch-and-drag gesture of a curved direction may also be used. The example embodiments may also be applied alike to a case in which a motion gesture is used.

Figure 5:
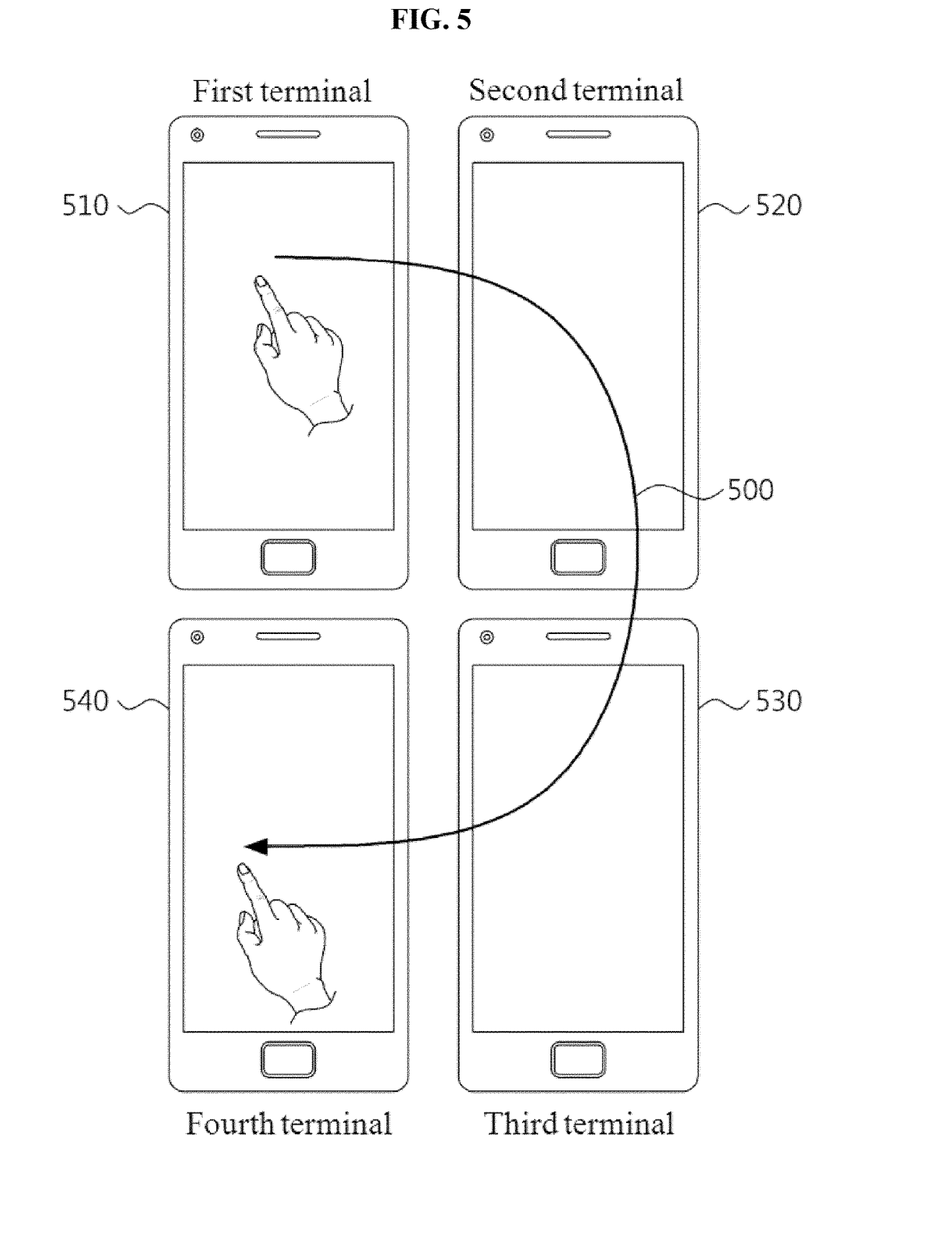
FIG. 5 illustrates an example of a process of generating information used to set a relationship among users of four terminals according to an example embodiment.

FIG. 5 illustrates an example of a process of generating information used to set a relationship among users of four terminals according to example embodiments. Referring to FIG. 5, four terminals, for example, a first terminal 510, a second terminal 520, a third terminal 530, and a fourth terminal 540 are disposed in a rectangular shape. Here, a user gesture is passed through all of the input interfaces of the first terminal 510 through the fourth terminal 540.

In the example of FIG. 5, portions of the user gesture may be recognized in order of the first terminal 510, the second terminal 520, the third terminal 530, and the fourth terminal 540. As described above, whether recognized gestures are portions of the single user gesture may be determined based on a location correlation between an end location and a start location of a recognized gesture between adjacent terminals. When the recognized gestures are determined to be portions of the single user gesture, an individual relationship may be set between the respective users of the first terminal 510 through the fourth terminal 540. Alternatively, the users may be set as a single group.

Here, a pattern of a user gesture may be predetermined and may be input in advance by a user. For example, the relationship setting system 100 of FIG. 1 may present a predetermined pattern to a user, thereby inducing the user to trigger a user gesture of the predetermined pattern.

As another example, a user may input in advance a pattern of a user gesture to be triggered by the user. In this case, the input pattern may be transmitted to and managed by the relationship setting system 100, and may also be compared with gestures recognized at terminals, for example, the first terminal 510 through the fourth terminal 540. For example, the relationship setting system 100 may determine whether to set a relationship between users by verifying whether the gestures recognized at the first terminal 510 through the fourth terminal 540 indicate the input pattern.

As described above, the relationship setting system 100 may further use at least one of a location correlation between geographical locations of terminals, information on a direction of each terminal, and information on a time at which a corresponding gesture is recognized at each terminal.

Figure 6:
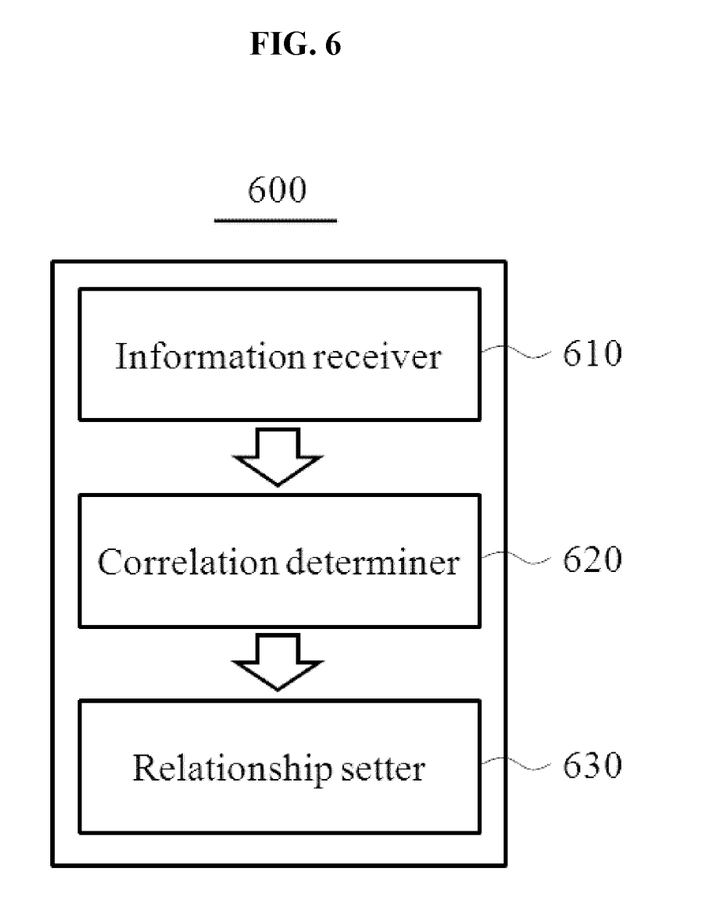
FIG. 6 is a block diagram illustrating an internal configuration of a relationship setting system according to an example embodiment.
Figure 7:
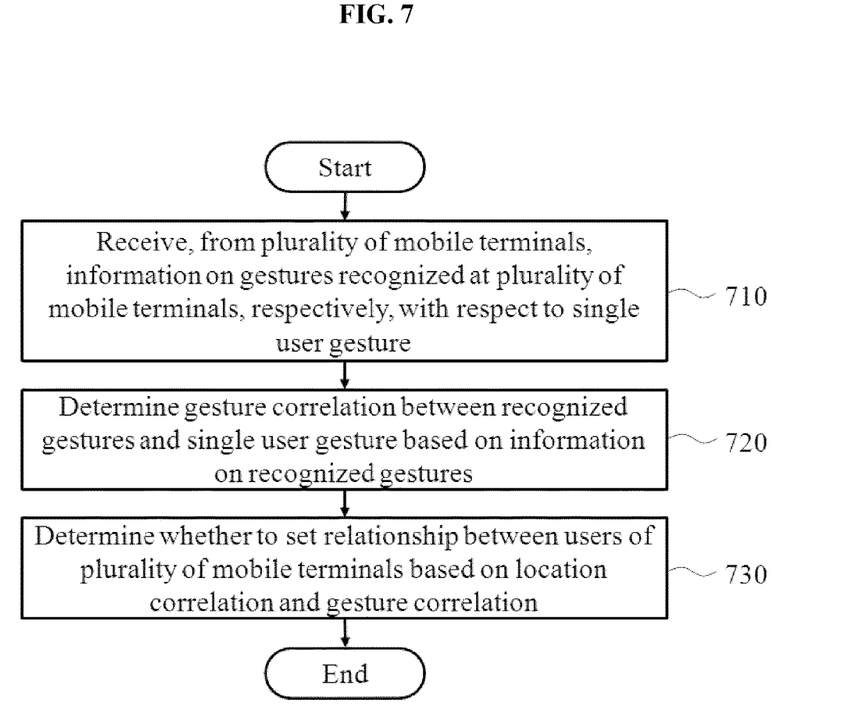
FIG. 7 is a flowchart illustrating a relationship setting method according to an example embodiment.

FIG. 6 is a block diagram illustrating an internal configuration of a relationship setting system 600 according to an example embodiment, and FIG. 7 is a flowchart illustrating a relationship setting method according to an example embodiment. The relationship setting system 600 of FIG. 6 corresponds to the relationship setting system 100 of FIG. 1, and includes an information receiver 610, a correlation determiner 620, and a relationship setter 630. Also, the relationship setting method of FIG. 7 may be performed by the relationship setting system 600, and each of operations included in the relationship setting method may be performed by the relationship setting system 600 or one of constituent elements of the relationship setting system 600.

In operation 710, the information receiver 610 receives, from a plurality of mobile terminals, information on gestures recognized at the plurality of mobile terminals, respectively, with respect to a single user gesture. Information on the recognized gestures is described above and thus, a further detailed description related thereto is omitted. An application associated with the relationship setting system 600 or a service system including the relationship setting system 600 or associated therewith may be installed in each of the plurality of mobile terminals. Each of the plurality of mobile terminals provides an interface for recognizing a gesture to users according to a control of the installed application, and may transmit information on the recognized gesture to the relationship setting system 600 via the interface.

In operation 720, the correlation determiner 620 determines a gesture correlation between the recognized gestures and the single user gesture based on information on the recognized gestures.

Information on the recognized gesture may at least include information on a location at which a recognition of the gesture starts and a location at which the recognition ends in a mobile terminal. For example, in operation 720, the relationship setting system 600 or the correlation determiner 620 determines a gesture correlation based on whether recognized gestures constitute a single connected gesture by comparing a recognition start location to a recognition end location with respect to the recognized gestures.

Also, in operation 720, the correlation determiner 620 determines whether the recognized gestures constitute a single connected gesture by further referring to direction information on each of the recognized gestures. Here, the correlation determiner 620 generates direction information on each of the recognized gestures based on information on the recognition start location and the recognition end location.

In operation 730, the relationship setter 630 determines whether to set a relationship between users of the plurality of mobile terminals based on the location correlation and the gesture correlation. For example, when the location correlation and the gesture correlation are present, the relationship setter 630 may set the relationship between the users.

Also, as described above, to more accurately determine whether to set the relationship, information on a direction of each of the plurality of mobile terminals and information on a time at which a gesture is recognized at each of the plurality of mobile terminals may be further used.

According to another example embodiment, in operation 710, the information receiver 610 may further receive information on times at which gestures are recognized at the plurality of mobile terminals, respectively. In this case, in operation 720, the correlation determiner 620 determines the gesture correlation by further referring to recognition order between the recognized gestures, which is determined based on information on the times.

Although not illustrated, the relationship setting method may further include determining a time correlation by comparing times at which the gestures are recognized. In this case, in operation 730, the relationship setter 630 determines whether to set a relationship between users of the plurality of mobile terminals by further referring to the time correlation. For example, when the times at which the gestures are recognized at the plurality of mobile terminals do not differ by at least a predetermined duration, the relationship setter 630 may determine that a time correlation is present and thereby set the relationship between the users of the plurality of mobile terminals.

According to still other example embodiments, in operation 710, the information receiver 610 may further receive information on directions of the plurality of mobile terminals. In this case, in operation 720, the correlation determiner 620 determines the gesture correlation by further referring to information on the directions.

Although not illustrated, the relationship setting method may further include determining a direction correlation by comparing information on the directions. In this case, in operation 730, the relationship setter 630 determines whether to set a relationship between users of the plurality of mobile terminals by further referring to the direction correlation. For example, when the plurality of mobile terminals is determined to be disposed in the same direction, the relationship setting system 600 may determine that a direction correlation is present and thereby set the relationship between users of the plurality of mobile terminals.

Figure 8:
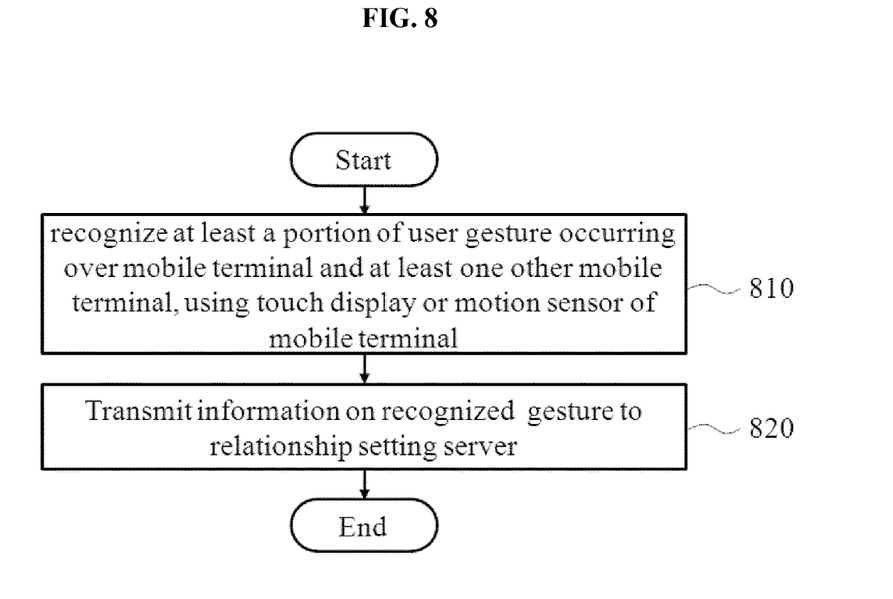
FIG. 8 is a flowchart illustrating a relationship setting method according to another example embodiment.

FIG. 8 is a flowchart illustrating a relationship setting method according to another example embodiment of the present invention. The relationship setting method of FIG. 8 refers to a method for setting a relationship between a user of a mobile terminal and a user of at least one other mobile terminal, and may be performed by the mobile terminal. In operation 810, the mobile terminal may recognize at least a portion of a user gesture occurring over the mobile terminal itself and the at least one other mobile terminal, using a touch display or a motion sensor of the mobile terminal.

In operation 820, the mobile terminal may transmit information on a recognized gesture to a relationship setting server. Here, the relationship setting server may correspond to the relationship setting system 600 of FIG. 6.

Similarly, the at least one other mobile terminal may also recognize at least a portion of the user gesture using a touch display or a motion sensor, and may transmit information on a recognized gesture and information on a geographical location to the relationship setting server. A method in which the relationship setting server sets a relationship between users of mobile terminals based on a plurality of sets of information received from the plurality of mobile terminals is described above and thus, a further repeated description is omitted here.

Also, an application may be installed in the mobile terminal to control the mobile terminal to perform the relationship setting method of FIG. 8. For example, the application may include modules configured to perform operations included in the relationship setting method of FIG. 8. The application may be provided to the mobile terminal through a file distribution system for distributing a file for an installation of the application. For example, the file distribution system may include a file manager (not shown) configured to manage a file for an installing of an application and to provide the file to the mobile terminal in response to a request of the mobile terminal.

Similarly, an application for controlling the relationship setting system 600 of FIG. 6 may be installed in the relationship setting system 600 to control the relationship setting system 600 to perform the relationship setting method of FIG. 7.

According to example embodiments, it is possible to set a relationship between users based on information on a plurality of touch-and-drag gestures respectively recognized at a plurality of terminals having a correlation therebetween in terms of at least a geographical location. Also, it is possible to set a relationship between users based on time information on times at which the plurality of touch-and-drag touches is recognized at the plurality of terminals, respectively, and direction information of the touch-and-drag touches. Also, it is possible to set a relationship between users based on a plurality of gestures recognized at a plurality of terminals, instead of using a motion of terminals via an acceleration sensor. Accordingly, even in a circumstance in which a motion of terminals cannot be accurately determined, such as in a driving vehicle, it is possible to obtain more accurate information used to set a relationship between users.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For simplicity, a processing device is described in singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially designed to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

It will be apparent to those skilled in the art that various modifications and variation can be made in the example embodiments without departing from the spirit or scope of the invention. Thus, it is intended that the example embodiments cover the modifications and variations of this invention provided they come within the scope of the appended claims and their equivalents.

What is claimed is:

1. A method for setting a relationship between users of a plurality of mobile terminals, the method comprising:
receiving, at an information receiver module in a server of a mobile application installed on each of the plurality of mobile terminals, from the plurality of mobile terminals, information on gestures made on, and recognized at, the plurality of mobile terminals, respectively, with respect to a single user gesture, wherein the mobile application relates to a social network service, and further wherein the receiving of the information on the recognized gestures further comprises receiving information on directions of the plurality of mobile terminals relative to each other including whether the plurality of mobile terminals are oriented in the same direction or oriented in a different direction by a predetermined angular amount;
determining, at a correlation determiner module in the server of the mobile application, a gesture correlation between the recognized gestures and the single user gesture based on the information on the recognized gestures, wherein the determining of the gesture correlation comprises further referring to information on the directions of the plurality of mobile terminals received during the receiving step; and
setting, at a relationship setter module in the server of the mobile application, a relationship within the social network service between users of the plurality of mobile terminals based on the gesture correlation,
wherein the information on the recognized gesture includes information on geographical locations of the plurality of mobile terminals,
wherein the information on the directions of the plurality of mobile terminals is obtained from a sensor included in each of the mobile terminals;
wherein the single user gesture comprises a gesture across at least two terminals,
wherein the method further comprises:
determining a location correlation of the plurality of mobile terminals based on the information on the geographical locations of the plurality of mobile terminals, wherein the location correlation is based on whether a distance between the geographical locations is within a predetermined distance range, and
setting the relationship between the users of the plurality of mobile terminals by further referring to the location correlation.

2. The method of claim 1, wherein the location correlation is determined based on whether a distance between the geographical locations is within a predetermined distance range.

3. The method of claim 1, wherein information on the recognized gestures comprises information on a location at which a recognition of a gesture starts and information on a location at which the recognition of the gesture ends in each of the plurality of mobile terminals.

4. The method of claim 3, wherein the determining of the gesture correlation is based on whether the recognized gestures constitute a single connected gesture by comparing a recognition start location to a recognition end location with respect to the recognized gestures.

5. The method of claim 4, wherein the determining of the gesture correlation further comprises generating direction information on each of the recognized gestures based on information on the recognition start location and the recognition end location.

6. The method of claim 1, wherein:
the receiving of the information on the recognized gestures comprises receiving information on times at which the gestures are recognized at the plurality of mobile terminals, respectively, and
the determining of the gesture correlation further comprises referring to a recognition order between the recognized gestures, based on the information on the times.

7. The method of claim 1, wherein:
the receiving of the information on the recognized gestures further comprises receiving information on times at which gestures are recognized at the plurality of mobile terminals, respectively, and
the method further comprises determining a time correlation by comparing the times at which the gestures are recognized, and
setting the relationship between the users of the plurality of mobile terminals by further referring to the time correlation.

8. The method of claim 1, wherein:
the method further comprises determining a direction correlation by comparing the information on the directions of the plurality of mobile terminals, and
setting the relationship between the users of the plurality of mobile terminals by further referring to the direction correlation.

9. The method of claim 1, wherein the predetermined angular amounts are 180 degrees, 90 degrees and 270 degrees.

10. The method of claim 1, wherein the single user gesture starts on a first one of the mobile terminals and ends on a second one of the mobile terminals.

11. The method of claim 1, wherein the sensor is selected from the group consisting of a gyro sensor, a geomagnetic sensor and an acceleration sensor.

12. A system for setting a relationship between users of a plurality of mobile terminals, comprising:
an information receiver in a server of a mobile application installed on each of the plurality of mobile terminals, configured to receive, from a plurality of mobile terminals, information on gestures made on, and recognized at, the plurality of mobile terminals, respectively, with respect to a single user gesture, wherein the mobile application relates to a social network service, and further wherein the receiving of the information on the recognized gestures further comprises receiving information on directions of the plurality of mobile terminals relative to each other including whether the plurality of mobile terminals are oriented in the same direction or oriented in a different direction by a predetermined angular amount;
a correlation determiner in a server of a mobile application installed on each of the plurality of mobile terminals, configured to determine a gesture correlation between the recognized gestures and the single user gesture based on the information on the recognized gestures, wherein the determining of the gesture correlation comprises further referring to information on the directions of the plurality of mobile terminals received by the information receiver; and a relationship setter in a server of a mobile application installed on each of the plurality of mobile terminals, configured to set a relationship within the social network service between users of the plurality of mobile terminals based on the gesture correlation, wherein the information on the directions of the plurality of mobile terminals is obtained from a sensor included in each of the mobile terminals;

wherein the information receiver is configured to further receive information on geographical locations of the plurality of mobile terminals, wherein the single user gesture comprises a gesture across at least two terminals, wherein the system further comprises:
determining, via the correlation determiner, a location correlation of the plurality of mobile terminals based on the information on the geographical locations of the plurality of mobile terminals, wherein the location correlation is based on whether a distance between the geographical locations is within a predetermined distance range, and setting, via the relationship setter, the relationship between the users of the plurality of mobile terminals by further referring to the location correlation.

13. The relationship setting system of claim 12, wherein the correlation determiner is configured to determine whether the location correlation is present based on whether a distance between the geographical locations is within a predetermined distance range.

14. The relationship setting system of claim 12, wherein information on the recognized gestures comprises information on a location at which a recognition of a gesture starts and information on a location at which the recognition of the gesture ends in each of the plurality of mobile terminals.

15. The relationship setting system of claim 14, wherein the correlation determiner is configured to determine whether the gesture correlation is present based on whether the recognized gestures constitute a single connected gesture by comparing a recognition start location to a recognition end location with respect to the recognized gestures.

16. The relationship setting system of claim 12, wherein:
the predetermined angular amounts are 180 degrees, 90 degrees and 270 degrees; and
the single user gesture starts on a first one of the mobile terminals and ends on a second one of the mobile terminals.

17. The relationship setting system of claim 12, wherein the sensor is selected from the group consisting of a gyro sensor, a geomagnetic sensor and an acceleration sensor.

18. A non-transitory computer-readable recording medium storing a program to implement a method for setting a relationship between users of a plurality of mobile terminals, the program when executed by a computer performs the steps comprising:
receiving, at an information receiver module in a server of the program installed on each of the plurality of mobile terminals, from the plurality of mobile terminals, information on gestures made on, and recognized at, the plurality of mobile terminals, respectively, with respect to a single user gesture, wherein the program relates to a social network service, and further wherein the receiving of the information on the recognized gestures further comprises receiving information on directions of the plurality of mobile terminals relative to each other including whether the plurality of mobile terminals are oriented in the same direction or oriented in a different direction by a predetermined angular amount;

determining, at a correlation determiner module in the server of the program, a gesture correlation between the recognized gestures and the single user gesture based on the information on the recognized gestures, wherein the determining of the gesture correlation comprises further referring to information on the directions of the plurality of mobile terminals received during the receiving step; and setting, at a relationship setter module in the server of the program, a relationship within the social network service between users of the plurality of mobile terminals based on the gesture correlation, wherein the information on the directions of the plurality of mobile terminals is obtained from a sensor included in each of the mobile terminals;

wherein the information on the recognized gesture includes information on geographical locations of the plurality of mobile terminals, wherein the single user gesture comprises a gesture across at least two terminals, further comprising:
determining a location correlation of the plurality of mobile terminals based on the information on the geographical locations of the plurality of mobile terminals, wherein the location correlation is based on whether a distance between the geographical locations is within a predetermined distance range, and setting the relationship between the users of the plurality of mobile terminals by further referring to the location correlation.

19. The non-transitory computer-readable recording medium according to claim 18, wherein:
the predetermined angular amounts are 180 degrees, 90 degrees and 270 degrees; and
the single user gesture starts on a first one of the mobile terminals and ends on a second one of the mobile terminals.

20. The non-transitory computer-readable recording medium of claim 18, wherein the sensor is selected from the group consisting of a gyro sensor, a geomagnetic sensor and an acceleration sensor.

21. A file distribution system configured to distribute a file for an installation of an application for controlling a mobile terminal to set a relationship between a user of the mobile terminal and a user of at least one other mobile terminal, wherein the application relates to a social network service, the file distribution system comprising:
a file manager configured to manage the file and to provide the file to the mobile terminal in response to a request of the mobile terminal,
wherein the application installed on the mobile terminal comprises:
a module, in a server of the application, configured to control the mobile terminal to recognize at least a portion of a user gesture occurring over the mobile terminal and the at least one other mobile terminal, using a touch display or a motion sensor of the mobile terminal; and
a module, in the server of the application, configured to control the mobile terminal to transmit information on the recognized portion of the user gesture to a relationship setting server, and wherein information on the recognized portion of the user gesture occurring over the at least one other mobile terminal is transmitted to the relationship setting server, wherein the information on the recognized portion of the user gesture occurring over the mobile terminal and the at least one other mobile terminal includes information on geographical locations of the mobile terminal and the at least one other mobile terminal, and further wherein the information on the recognized portion of the user gesture also includes information on directions of the plurality of mobile terminals relative to each other including whether the plurality of mobile terminals are oriented in the same direction or oriented in a different direction by a predetermined angular amount, and wherein the information on the directions of the plurality of mobile terminals is obtained from a sensor included in each of the mobile terminals;

whether to set a relationship within the social network service between the user of the mobile terminal and the user of the at least one other mobile terminal is determined at the relationship setting server based on information on gestures transmitted from the mobile terminal and the at least one other mobile terminal and by referring to information on the directions of the plurality of mobile terminals, wherein the single user gesture comprises a gesture across at least two terminals, further comprising:

determining a location correlation of the plurality of mobile terminals based on the information on the geographical locations of the plurality of mobile terminals, wherein the location correlation is based on whether a distance between the geographical locations is within a predetermined distance range, and setting the relationship between the users of the plurality of mobile terminals by further referring to the location correlation.

22. The file distribution system of claim 21, wherein a gesture correlation between the transmitted gestures and the user gesture is determined at the relationship setting server based on information on the transmitted gestures, and whether to set the relationship between the user of the mobile terminal and the user of the at least one other mobile terminal is determined at the relationship setting server based on the gesture correlation.

23. The file distribution system of claim 21, wherein:
the predetermined angular amounts are 180 degrees, 90 degrees and 270 degrees; and
the single user gesture starts on a first one of the mobile terminals and ends on a second one of the mobile terminals.

24. The file distribution system of claim 21, wherein the sensor is selected from the group consisting of a gyro sensor, a geomagnetic sensor and an acceleration sensor.

* * * * *